(12) United States Patent
Kimura et al.

(10) Patent No.: US 11,932,787 B2
(45) Date of Patent: Mar. 19, 2024

(54) TWO-PART CURABLE ADHESIVE COMPOSITION

(71) Applicant: THE YOKOHAMA RUBBER CO., LTD., Tokyo (JP)

(72) Inventors: Kazushi Kimura, Hiratsuka (JP); Hirokazu Kageyama, Hiratsuka (JP); Yutaro Yamamoto, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 563 days.

(21) Appl. No.: 17/280,001

(22) PCT Filed: Sep. 27, 2019

(86) PCT No.: PCT/JP2019/038395
§ 371 (c)(1),
(2) Date: Mar. 25, 2021

(87) PCT Pub. No.: WO2020/067527
PCT Pub. Date: Apr. 2, 2020

(65) Prior Publication Data
US 2022/0033695 A1 Feb. 3, 2022

(30) Foreign Application Priority Data
Sep. 28, 2018 (JP) .................................. 2018-185945

(51) Int. Cl.
*C09J 175/08* (2006.01)
*C08G 18/10* (2006.01)
(Continued)

(52) U.S. Cl.
CPC ............ *C09J 175/08* (2013.01); *C08G 18/10* (2013.01); *C08G 18/44* (2013.01);
(Continued)

(58) Field of Classification Search
None
See application file for complete search history.

(56) References Cited

U.S. PATENT DOCUMENTS 3,714,127 A * 1/1973 Fabris et al. ........... C08G 18/10
528/905
3,886,122 A * 5/1975 Fabris .................... C08G 18/10
528/53
(Continued)

FOREIGN PATENT DOCUMENTS

CN 102272184 A 12/2011
JP S62-191076 A 8/1987
(Continued)

OTHER PUBLICATIONS

Translation of JP-62191076, 5 pages. (Year: 1987).*

*Primary Examiner* — Robert S Loewe
(74) *Attorney, Agent, or Firm* — Carrier, Shende & Associates P.C.; Joseph P. Carrier; Fulchand P. Shende

(57) ABSTRACT

A two-part curable adhesive composition includes a main agent (A) containing a urethane prepolymer (a1) and a remaining polyisocyanate (a2), and a curing agent (B) containing a non-crystalline polyol compound (b1) and a polyamine compound (b2). An equivalent ratio of an isocyanate group in a raw polyisocyanate to a hydroxyl group in the polyol compound is from 2.05 to 12. The equivalent ratio of the isocyanate group in the main agent (A) to an amino group in the polyamine compound (b2) is from 1.2 to 6. The equivalent ratio of the isocyanate group in the main agent (A) to the hydroxyl group in the non-crystalline polyol compound (b1) is from 2 to 12.

20 Claims, 1 Drawing Sheet

(51) Int. Cl.
*C08G 18/44* (2006.01)
*C08G 18/48* (2006.01)
*C08G 18/76* (2006.01)
*C09J 175/04* (2006.01)

(52) U.S. Cl.
CPC ..... *C08G 18/4854* (2013.01); *C08G 18/7671* (2013.01); *C09J 175/04* (2013.01)

(56) References Cited

U.S. PATENT DOCUMENTS

| | | | | |
|---|---|---|---|---|
| 4,373,082 A * | 2/1983 | Kimball | ................. | C09J 175/12 528/77 |
| 4,552,934 A * | 11/1985 | Rabito | ................... | C08G 18/10 524/451 |
| 4,743,672 A * | 5/1988 | Goel | ...................... | C08G 18/10 528/905 |
| 4,954,199 A * | 9/1990 | Rains | ................. | C08G 18/6529 156/331.7 |
| 4,994,540 A * | 2/1991 | Boerner | ................ | C08G 18/667 521/137 |
| 5,002,806 A * | 3/1991 | Chung | ................... | C09J 175/08 427/322 |
| 5,204,439 A * | 4/1993 | Dormish | ................ | C08G 18/10 521/137 |
| 5,508,111 A * | 4/1996 | Schmucker | ............ | C08G 18/10 524/871 |
| 5,672,653 A * | 9/1997 | Frisch | ................... | C09D 175/14 524/591 |
| 5,994,466 A * | 11/1999 | Yang | ...................... | C08G 18/69 525/131 |
| 6,046,297 A * | 4/2000 | Rosenberg | ......... | C08G 18/7621 528/63 |
| 6,423,810 B1 * | 7/2002 | Huang | ................... | C09J 175/04 528/80 |
| 6,495,652 B1 * | 12/2002 | Reichelt | ............... | C09K 3/1021 521/174 |
| 8,410,213 B2 * | 4/2013 | Barker | ............... | C08G 18/4841 156/331.7 |
| 2012/0295104 A1 | 11/2012 | Barker | | |
| 2013/0158291 A1 * | 6/2013 | Pirkl | .................... | C08G 18/0895 560/336 |
| 2019/0136105 A1 | 5/2019 | Abe et al. | | |
| 2021/0032517 A1 * | 2/2021 | Muller-Sellak | ...... | C08G 18/725 |
| 2021/0122869 A1 * | 4/2021 | Michaud | ........... | C08G 18/7664 |

FOREIGN PATENT DOCUMENTS

| | | |
|---|---|---|
| JP | 2014-522426 A | 9/2014 |
| JP | 2017-218539 A | 12/2017 |

* cited by examiner

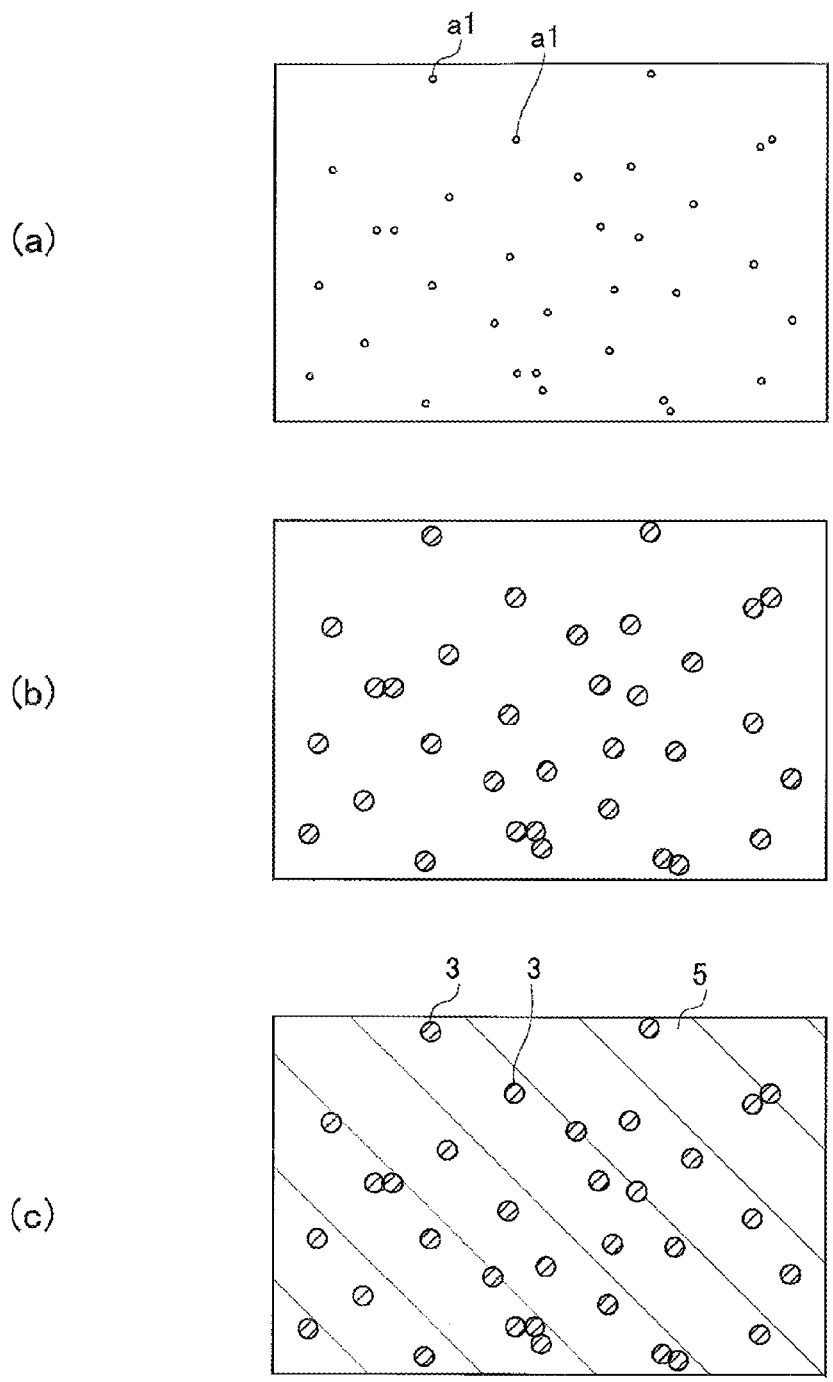

TWO-PART CURABLE ADHESIVE COMPOSITION

TECHNICAL FIELD

The present invention relates to a two-part curable adhesive composition having a main agent and a curing agent.

BACKGROUND ART

In structural members such as automotive bodies, components formed from different materials may be bonded together using an adhesive. By bonding through the adhesive, distortion and warpage can be suppressed even if a difference in coefficient of thermal expansion between the components is large. On the other hand, the adhesive used in such applications requires good tensile properties such as strength at break and elongation at break in a cured state as an indicator of adhesive strength.

As an adhesive composition from which a cured product with excellent elongation at break is obtained, there is known a two-part curable polyurethane adhesive composition including a main agent containing a urethane prepolymer and a curing agent containing a compound having an active hydrogen group. In the two-part curable adhesive composition, in general, a compounded ratio of the main agent and the curing agent is adjusted so that an equivalent ratio of an isocyanate group contained in the main agent and a hydroxyl group in polyol contained in the curing agent is approximately 1. However, when the isocyanate group and the hydroxyl group are approximately in an equivalent amount, a curing rate of urethane prepolymer is extremely slow. Thus, attempts have been made to accelerate the curing rate using a catalyst such as an organic metal compound, a tertiary amine, or the like (Patent Document 1). However, when the adhesive composition is rapidly cured using a catalyst, foaming may occur, which leads to a problem that the tensile properties of the cured product are diminished.

CITATION LIST

Patent Document

Patent Document 1: JP 2017-218539 A

SUMMARY OF INVENTION

Technical Problem

In terms of the tensile properties of the cured product, it is known that the strength at break and the elongation at break are increased by using a polyol compound having high crystallinity as a skeleton of polyurethane. However, when the polyol compound having high crystallinity is the skeleton of polyurethane, there is a problem that temperature dependence of viscoelastic properties such as storage modulus, loss modulus, loss tangent, and the like is extremely high.

An object of the present invention is to provide a two-part curable adhesive composition from which a cured product having excellent tensile properties such as strength at break and elongation at break and having low temperature dependence of viscoelastic properties is obtained and which can suppress foaming.

Solution to Problem

One aspect of the present invention is a two-part curable adhesive composition including a main agent (A) containing a urethane prepolymer (a1), and a curing agent (B) containing a non-crystalline polyol compound (b1) and a polyamine compound (b2), the urethane prepolymer (a1) being obtained by reacting a raw polyisocyanate and a crystalline polyol compound having a number average molecular weight of 500 or greater and having at least one hydroxyl group per molecule so that an equivalent ratio of an isocyanate group in the raw polyisocyanate to the hydroxyl group in the crystalline polyol compound is from 2.05 to 12 and all of the crystalline polyol compounds are monomer units of the urethane prepolymer (a1), the main agent (A) further containing, in addition to the urethane prepolymer (a1), a remaining polyisocyanate (a2) that is a remainder of the raw polyisocyanate that has not been reacted with the crystalline polyol compound, the non-crystalline polyol compound (b1) being a compound having a number average molecular weight of 1000 or greater and having at least two hydroxyl groups per molecule, the equivalent ratio of the isocyanate group in the main agent (A) to an amino group in the polyamine compound (b2) being from 1.2 to 6, and the equivalent ratio of the isocyanate group in the main agent (A) to the hydroxyl group in the non-crystalline polyol compound (b1) being from 2 to 12.

Preferably, the equivalent ratio of the amino group in the polyamine compound (b2) to the hydroxyl group in the non-crystalline polyol compound (b1) is from 1.5 to 6.

Preferably, a ratio of a mass of the crystalline polyol compound to a mass of the non-crystalline polyol compound (b1) is 1 or less.

Preferably, the crystalline polyol compound is at least one selected from polyester polyol, polytetramethylene ether glycol, polycarbonate polyol, and polycaprolactone polyol.

Preferably, the crystalline polyol compound is polytetramethylene ether glycol or polycarbonate polyol.

Preferably, the non-crystalline polyol compound (b1) is at least one selected from polyoxypropylene glycol, polybutadiene polyol, polyisoprene polyol, and polyacrylic polyol.

Preferably, a terminal end of the non-crystalline polyol compound (b1) includes at least one selected from a primary hydroxyl group, a secondary hydroxyl group, an amino group, an acid anhydride modified group, and a ring-opened group formed by ring opening of an acid anhydride modified group.

Preferably, the curing agent (b) further contains a diol compound (b3) having a number average molecular weight of 200 or less.

Preferably, the remaining polyisocyanate (a2) is at least one selected from diphenylmethane diisocyanate, polymeric methane diisocyanate, and isocyanate compound having an isocyanurate group.

Preferably, the non-crystalline polyol compound (b1) includes in the molecule at least one of a monomer unit of polyethylene glycol or a monomer unit of polypropylene glycol.

Preferably, the polyamine compound (b2) has a number average molecular weight of less than 500 and has at least two amino groups and at least one aromatic group per molecule.

Preferably, an equivalent ratio of the isocyanate group in the main agent (A) to the total active hydrogen groups in the curing agent (B) is from 0.5 to 4.

Preferably, a mass ratio of the main agent (A) to the curing agent (B) is adjusted to be from 3:7 to 7:3.

Preferably, a storage modulus (E1') at 130° C. of a cured product obtained by curing the two-part curable adhesive composition is 50% or greater of a storage modulus (E2') at −40° C.

Preferably, the cured product obtained by curing the two-part curable adhesive composition has a tensile strength in accordance with JIS K6251 of 10 MPa or greater and an elongation at break of 100% or greater.

Preferably, a tensile modulus of the cured product obtained by curing the two-part curable adhesive composition is 50 MPa or greater.

Preferably, a usable time of the two-part curable adhesive composition is from 30 seconds to 10 minutes.

Preferably, the main agent (A) contains at least one selected from fillers, anti-aging agents, colorants, viscosity modifiers, and plasticizers.

Preferably, the curing agent (B) contains at least one selected from fillers, anti-aging agents, colorants, viscosity modifiers, plasticizers, and polyhydric alcohols having a number average molecular weight of less than 500.

Another aspect of the present invention is a two-part curable adhesive composition including a main agent (A) containing a urethane prepolymer (a1), and
  a curing agent (B) containing a non-crystalline polyol compound (b1) and a polyamine compound (b2),
  the urethane prepolymer (a1) being obtained by reacting a raw polyisocyanate and a crystalline polyol compound having a number average molecular weight of 500 or greater and having at least one hydroxyl group per molecule so that an equivalent ratio of an isocyanate group in the raw polyisocyanate to the hydroxyl group in the crystalline polyol compound is from 2.05 to 12 and all of the crystalline polyol compounds are monomer units of the urethane prepolymer (a1),
  the main agent (A) further containing, in addition to the urethane prepolymer (a1), a remaining polyisocyanate (a2) that is a remainder of the raw polyisocyanate that has not been reacted with the crystalline polyol compound,
  the non-crystalline polyol compound (b1) being a compound having a number average molecular weight of 1000 or greater and having at least two hydroxyl groups per molecule, and
  the equivalent ratio of the isocyanate group in the main agent (A) to an amino group in the polyamine compound (b2) and the equivalent ratio of the isocyanate group in the main agent (A) to the hydroxyl group in the non-crystalline polyol compound (b1) being adjusted so that a storage modulus (E1') at 130° C. of a cured product obtained by curing the two-part curable adhesive composition is 50% or greater of a storage modulus (E2') at −40° C.

Another aspect of the present invention is a method for producing a two-part curable adhesive composition, including a step of preparing a main agent (A) containing a urethane prepolymer (a1), and
  a curing agent (B) including a step of preparing a non-crystalline polyol compound (b1) and a polyamine compound (b2),
  in the step of preparing the main agent (A), the urethane prepolymer (a1) being prepared by reacting a raw polyisocyanate and a crystalline polyol compound having a number average molecular weight of 500 or greater and having at least one hydroxyl group per molecule so that an equivalent ratio of an isocyanate group in the raw polyisocyanate to the hydroxyl group in the crystalline polyol compound is from 2.05 to 12 and all of the crystalline polyol compounds are monomer units of the urethane prepolymer (a1),
  the main agent (A) further containing, in addition to the urethane prepolymer (a1), a remaining polyisocyanate (a2) that is a remainder of the raw polyisocyanate that has not been reacted with the crystalline polyol compound,
  the non-crystalline polyol compound (b1) being a compound having a number average molecular weight of 1000 or greater and having at least two hydroxyl groups per molecule,
  the equivalent ratio of the isocyanate group in the main agent (A) to an amino group in the polyamine compound (b2) being from 1.2 to 6, and
  the equivalent ratio of the isocyanate group in the main agent (A) to the hydroxyl group in the non-crystalline polyol compound (b1) being from 2 to 12.

Advantageous Effects of Invention

According to the two-part curable adhesive composition of the above aspect, tensile properties of a cured product, such as strength at break and elongation at break, are excellent, a cured product having low temperature dependence of viscoelastic properties is obtained, and foaming can be suppressed.

BRIEF DESCRIPTION OF DRAWINGS

FIGS. 1(a) to 1(c) are diagrams that conceptually illustrate a curing reaction of an adhesive composition.

DESCRIPTION OF EMBODIMENTS

A two-part curable adhesive composition of the present embodiment will be explained below. The present embodiment includes various embodiments described below.
(Adhesive Composition)

The two-part curable adhesive composition (hereinafter, also simply referred to as adhesive composition) of the present embodiment has a main agent (A) and a curing agent (B).
(Main Agent (A))

The main agent (A) contains a urethane prepolymer (a1).

The urethane prepolymer (a1) is obtained by reacting a raw polyisocyanate and a crystalline polyol compound. Accordingly, the urethane prepolymer (a1) has a monomer unit of polyisocyanate and a monomer unit of a crystalline polyol compound. Specifically, the reaction is performed so that an equivalent ratio (hereinafter, also referred to as index) of an isocyanate group in the raw polyisocyanate to the hydroxyl group in the crystalline polyol compound is from 2.05 to 12 and all of the crystalline polyol compounds are monomer units of the urethane prepolymer (a1).

Setting the index to 2.05 or greater makes it easier to obtain a cured product having excellent strength at break, specifically, a cured product having a strength at break of 10 MPa or greater. In the present specification, the strength at break means tensile strength in accordance with JIS K6251.

In addition, the index is 2.05 or greater, and the isocyanate group is greatly excessive with respect to the hydroxyl group, so that the isocyanate group remaining after the reaction between the raw polyisocyanate and the crystalline polyol compound can be sufficiently reacted with the curing agent (B). This makes it easier to obtain a cured product having excellent elongation at break, specifically, a cured product having a elongation at break of 100% or greater. In the present specification, the elongation at break means an elongation at the time of cutting in accordance with JIS K6251.

The index is preferably 3 or greater and more preferably 4 or greater. On the other hand, in a case where the equivalent ratio is too large, the elongation at break may be too low. Thus, the equivalent ratio is 12 or less, preferably 10 or less and more preferably 8 or less.

According to the adhesive composition of the present embodiment, after the polyisocyanate is added to the crystalline polyol compound, a product resulting from reaction with the active hydrogen groups of the curing agent (B) and a product resulting from reaction with the active hydrogen groups of the curing agent (B) after the polyisocyanate remains without reacting with the crystalline polyol compound are formed in the cured product. Thus, a polymer blend is produced through a time lag between these reactions of the polyisocyanate and mixing of the crystalline polyol compound and non-crystalline polyol compound (b1).

The raw polyisocyanate is not particularly limited as long as the raw polyisocyanate has two or more isocyanate groups in the molecule. Known polyisocyanate compounds can be used for the raw polyisocyanate.

Specific examples of the polyisocyanate compound used for the raw polyisocyanate include aromatic polyisocyanates such as TDI (e.g., 2,4-tolylene diisocyanate (2,4-TDI) and 2,6-tolylene diisocyanate (2,6-TDI)), MDI (e.g., 4,4'-diphenylmethane diisocyanate (4,4'-MDI) and 2,4'-diphenylmethane diisocyanate (2,4'-MDI)), 1,4-phenylene diisocyanate, polymethylene polyphenylene polyisocyanate, xylylene diisocyanate (XDI), tetramethylxylylene diisocyanate (TMXDI), tolidine diisocyanate (TODI), 1,5-naphthalene diisocyanate (NDI), and triphenylmethane triisocyanate; aliphatic polyisocyanates such as pentamethylene diisocyanate (PDI), hexamethylene diisocyanate (HDI), trimethylhexamethylene diisocyanate (TMHDI), lysine diisocyanate, and norbornane diisocyanate (NBDI); alicyclic polyisocyanates such as transcyclohexane-1,4-diisocyanate, isophorone diisocyanate (IPDI), bis(isocyanate methyl)cyclohexane ($H_6$XDI), and dicyclohexylmethane diisocyanate ($H_{12}$MDI); carbodiimide-modified polyisocyanates thereof; isocyanurate-modified polyisocyanates thereof; and the like.

Such a polyisocyanate may be used alone, or two or more types of these polyisocyanates may be used in combination.

Among these, an aromatic polyisocyanate is preferable, and MDI is more preferable, from the perspective of excellent curability.

According to one embodiment, the raw polyisocyanate preferably includes at least one of diphenylmethane diisocyanate, polymeric methane diisocyanate, and isocyanate compound having an isocyanurate group from the viewpoint of improving reaction activity and exhibiting good strength when cured.

The crystalline polyol compound (hydroxyl group-containing crystalline compound) has at least one, and preferably at least two, hydroxyl groups per molecule and has a number average molecular weight of 500 or greater.

When the number average molecular weight of the crystalline polyol compound is less than 500, the elongation at break of the cured product decreases, and the cured product may become too hard. Even if the equivalent ratio (NCO group/total active hydrogen group ratio) to be described later, or a mixing ratio of the main agent (A) to the curing agent (B) is adjusted, it is difficult to adjust a tensile modulus (hereinafter, also simply referred to as the elastic modulus)

of the cured product. The upper limit of the number average molecular weight of the crystalline polyol compound is, for example, 3000.

From the viewpoint of effectively improving the strength at break and elongation at break of the cured product, for the crystalline polyol compound, at least one selected from polyester polyol, polytetramethylene ether glycol, polycarbonate polyol, and polycaprolactone polyol is used.

Examples of the polyester polyol include condensation products (condensed polyester polyols) of low-molecular-weight polyhydric alcohols with a polybasic carboxylic acid.

Specific examples of the low-molecular-weight polyhydric alcohols include low-molecular-weight polyols such as ethylene glycol (EG), diethylene glycol, propylene glycol (PG), dipropylene glycol, 1,3-butanediol, 1,4-butanediol, pentanediol, neopentyl glycol, hexanediol, cyclohexanedimethanol, glycerin, 1,1,1-trimethylolpropane (TMP), 1,2,5-hexanetriol, and pentaerythritol; sugars such as sorbitol; and the like.

Examples of the polybasic carboxylic acids which may be used here to form the condensed polyester polyol include glutaric acid, adipic acid, azelaic acid, fumaric acid, maleic acid, pimelic acid, suberic acid, sebacic acid, phthalic acid, terephthalic acid, isophthalic acid, dimer acid, pyromellitic acid, other low-molecular-weight carboxylic acids, oligomeric acids, castor oil, and hydroxycarboxylic acids such as a reaction product of castor oil with ethylene glycol (or propylene glycol).

The polycarbonate polyol is produced via, for example, a reaction such as a methanol removal condensation reaction of polyol and dimethyl carbonate, a phenol removal condensation reaction of polyol and diphenyl carbonate, or a ethylene removal glycol condensation reaction of polyol and ethylene carbonate. Examples of the polyol used in these reactions include various saturated or unsaturated glycols such as 1,6-hexanediol, diethylene glycol, triethylene glycol, propylene glycol, 1,3-butanediol, 1,4-butanediol, neopentyl glycol, pentanediol, 3-methyl-1,5-pentanediol, octanediol, 1,4-butynediol, dipropylene glycol, tripropylene glycol, and polytetramethylene ether glycol; alicyclic glycols such as 1,4-cyclohexane diglycol and 1,4-cyclohexane dimethanol; and the like.

Examples of the polycaprolactone polyols include compounds that are obtained by ring-opening polymerization of a lactone such as ε-caprolactone, α-methyl-ε-caprolactone, or ε-methyl-ε-caprolactone with a suitable polymerization initiator, and that have hydroxy groups at both terminal ends.

The number average molecular weight of the urethane prepolymer (a1) is preferably from 1000 to 15000 and more preferably from 1000 to 10000.

Here, the number average molecular weight is a number average molecular weight (expressed in calibration with polystyrene) measured by gel permeation chromatography (GPC), and for the measurement, tetrahydrofuran (THF) and N,N-dimethylformamide (DMF) are preferably used as solvents.

In addition to the urethane prepolymer (a1), the main agent (A) further contains a remaining polyisocyanate (a2).

The remaining polyisocyanate (a2) is the remainder of the raw polyisocyanate that has not been reacted with the crystalline polyol compound. Since the remaining polyisocyanate (a1) is contained in the main agent (A), it is possible to rapidly react with the curing agent (B). As a result, a curing time can be shortened, the remaining polyisocyanate (a1) can be prevented from reacting with moisture and foaming, and it is possible to suppress a reduction in tensile properties such as the strength at break and elongation at break of the cured product.

(Curing Agent (B))

The curing agent (B) contains a polyamine compound (b2) and a non-crystalline polyol compound (b1).

Since the polyamine compound (b2) has a high reaction rate with polyisocyanate, the reaction with the remaining polyisocyanate (a2) proceeds rapidly. The polyamine (b2) is also reacted with the urethane prepolymer (a1) and grows the urethane prepolymer (a1) while curing the urethane prepolymer (a1). In this process, the adhesive composition in which the main agent (A) and the curing agent (B) are mixed generates heat due to these reactions, so that a reaction between the non-crystalline polyol compound (b1) and the remaining polyisocyanate (a2) is promoted. This has the effect of shortening the curing time and shortening a usable time.

The polyamine compound (b2) is not particularly limited as long as the polyamine compound (b2) has two or more amino groups in the molecule, and a known polyamine compound can be used.

Specific examples of the polyamine compound (b2) include aliphatic polyamines such as ethylenediamine, propylenediamine, butylenediamine, diethylenetriamine, triethylenetriamine, triethylenetetramine, tetraethylenepentamine, pentaethylenehexamine, hexamethylenediamine, trimethylhexamethylenediamine, 1,2-propanediamine, iminobispropylamine, methyliminobispropylamine, and 1,5-diamino-2-methylpentane (MPMD, available from Dupont K.K.); aromatic polyamines such as meta-phenylenediamine, ortho-phenylenediamine, para-phenylenediamine, m-xylylenediamine (MXDA), diaminodiphenyl methane, diaminodiphenyl sulfone, diamino diethyldiphenylmethane, diethylmethylbenzenediamine, 2-methyl-4,6-bis(methylthio)-1,3-benzenediamine, 4,4'-methylenebis(2-chloroaniline), 4,4'-methylenebis(3-chloro-2,6-diethylaniline), trimethylenebis(4-aminobenzoate), bis(4-amino-2,3-dichlorophenyl) methane; N-aminoethylpiperazine; monoamine having an ether bond in its main chain, such as 3-butoxyisopropylamine; diamines having a polyether backbone, that is exemplified by JEFFAMINE EDR148 available from Sun Techno Chemicals Co., Ltd.; alicyclic polyamines such as isophoronediamine, 1,3-bisaminomethylcyclohexane (1,3BAC, available from Mitsubishi Gas Chemical Company, Inc.), 1-cyclohexylamino-3-aminopropane, and 3-aminomethyl-3,3,5-trimethyl-cyclohexylamine; diamines having a norbornane backbone, such as norbornanediamine (NBDA, available from Mitsui Chemicals, Inc.); polyamide amines having an amino group at a molecular end of polyamide; 2,5-dimethyl-2,5-hexamethylene diamine, menthenediamine, 1,4-bis(2-amino-2-methylpropyl)piperazine, JEFFAMINE D230 and JEFFAMINE D400, available from Sun Techno Chemicals Co., Ltd., having polypropylene glycol (PPG) as a backbone. These polyamine compounds may be used alone or may be used in a combination of two or more types.

The equivalent ratio of the isocyanate group in the main agent (A) to the amino group in the polyamine compound (b2) (hereinafter, also referred to as isocyanate group/amino group ratio) is from 1.2 to 6. In a case where the isocyanate group/amino group ratio is less than 1.2, a chance of reacting the isocyanate group of the remaining polyisocyanate (a2) with the hydroxyl group of the non-crystalline polyol compound (b1) is reduced, and the elongation at break of the cured product become difficult to be improved. On the other hand, in a case where the isocyanate group/amino group ratio exceeds 6, a curing rate of the adhesive composition is slow, and the possibility of foaming increases. Furthermore, in a case where the isocyanate group/amino group ratio exceeds 6, even if the cured product contains a crystalline polyol compound and a skeleton of the non-crystalline polyol compound (b1), temperature dependence of viscoelastic properties of the cured product cannot be reduced.

According to one embodiment, the polyamine compound (b2) preferably has a number average molecular weight of less than 500 and has at least two amino groups and at least one aromatic group per molecule from the viewpoint of increasing the reaction rate with the remaining polyisocyanate (a2).

The non-crystalline polyol compound (b1) has at least two hydroxyl groups per molecule and has a number average molecular weight of 1000 or greater. Since the non-crystalline polyol compound (b1) is contained in the curing agent (B), the elongation at break of the cured product can be increased. In a case where the number average molecular weight of the non-crystalline polyol compound (b1) is less than 1000, the elongation at break of the cured product decreases, and the cured product may become too hard.

In the cured product of the adhesive composition, products resulting from the reactions of polyisocyanate with a plurality of types of compounds, that is, a crystalline polyol compound, a non-crystalline polyol compound, or a polyamine compound are formed, so that the temperature dependence of viscoelastic properties of the cured product decreases. As described above, when various compounds are introduced as a skeleton of the cured product, a change of the tensile properties as a function of temperature in a temperature region (for example, in a range of from −40 to 180° C.) assumed to be the usage temperature of the cured product is suppressed and becomes stable.

In the non-crystalline polyol compound (b1), compared to the polyamine compound (b2), the reaction with polyisocyanate proceeds slowly, so that the curing time is not too short, and this contributes to improvement of workability.

By using the crystalline polyol compound and the non-crystalline polyol compound (b1) as the raw materials of the adhesive composition, the tensile modulus of the cured product can be adjusted.

According to one embodiment, the non-crystalline polyol compound (b1) is preferably at least one selected from polyoxypropylene glycol, polybutadiene polyol, polyisoprene polyol, polyacrylic polyol, and the like from the viewpoint of effectively improving the strength at break and elongation at break of the cured product.

The equivalent ratio of the isocyanate group in the main agent (A) to the hydroxyl group in the non-crystalline polyol compound (b1) (hereinafter referred to as isocyanate group/hydroxyl group ratio) is from 2 to 12. In a case where the isocyanate group/hydroxyl group ratio is less than 2, when the isocyanate group/amino group ratio is small, the usable time is shortened, and the elongation at break of the cured product decreases. On the other hand, when the isocyanate group/hydroxyl group ratio is less than 2 and the isocyanate group/amino group ratio is large, the usable time increases, foaming tends to occur, and it becomes difficult to improve the strength at break. In a case where the isocyanate group/hydroxyl group ratio exceeds 12, the usable time increases, and foaming tends to occur.

In a case where the isocyanate group/hydroxyl group ratio is less than 2, or in a case where the isocyanate group/hydroxyl group ratio exceeds 12, even if the cured product contains a crystalline polyol compound and a skeleton of the non-crystalline polyol compound (b1), the temperature dependence of viscoelastic properties of the cured product cannot be reduced.

According to one embodiment, the non-crystalline polyol compound (b1) preferably contains at least one of polyethylene glycol or polypropylene glycol. Furthermore, according to one embodiment, the non-crystalline polyol compound (b1) particularly preferably has a primary hydroxyl group at a terminal end.

According to one embodiment, the terminal end of the non-crystalline polyol compound (b1) preferably includes at least one selected from a primary hydroxyl group, a secondary hydroxyl group, an amino group, an acid anhydride modified group, and a ring-opened group formed by ring opening of an acid anhydride modified group from the viewpoint of improving the reaction activity. The acid anhydride modified group is a group formed by adding an acid anhydride to the terminal end. The acid anhydride may be those formed by dehydration condensation of carboxylic acid of two molecules or those produced by dehydration between two carboxyl groups in the molecule, and examples thereof include acetic anhydride, propionic anhydride, oxalic anhydride, succinic anhydride, maleic anhydride, phthalic anhydride, benzoic anhydride, and the like. The ring-opened group formed by ring opening of an acid anhydride modified group means a functional group formed by reacting an acid anhydride with any of water, a hydroxyl group, an amino group, an epoxy group, and the like. A cyclic anhydride such as succinic anhydride, maleic anhydride, phthalic anhydride, or the like is used as the acid anhydride of the acid anhydride modified group serving as a ring-opened group.

According to one embodiment, the curing agent (B) preferably further contains a hydroxyl group-containing compound (b3), having a number average molecular weight of 200 or less, in an amount of 5% by mass or greater of the curing agent (B) in order to adjust the reaction rate and physical properties of the cured product. The hydroxyl group-containing compound (b3) is, for example, a diol compound or a triol compound, and the number of hydroxyl groups contained in one molecule is from 2 to 4, for example. The content of the hydroxyl group-containing compound (b3) is preferably from 5 to 20% by mass of the curing agent (B).

According to one embodiment, in order to obtain a suitable usable time, the equivalent ratio of the amino group in the polyamine compound (b2) to the hydroxyl group in the non-crystalline polyol compound (b1) (hereinafter, also referred to as the amino group/hydroxyl group ratio) is preferably from 1.5 to 6. As a result, the usable time of the adhesive composition can be set to a more suitable length of time. The equivalent ratio is preferably from 1.5 to 4.

A ratio of a mass of the crystalline polyol compound reacted with the raw polyisocyanate to a mass of the non-crystalline polyol compound (b1) is preferably 1 or less from the viewpoint of adjusting the physical properties of the cured product and reducing the temperature dependence of viscoelastic properties.

According to one embodiment, the equivalent ratio of the isocyanate group in the main agent (A) to the active hydrogen group in the curing agent (B) (hereinafter, also referred to as NCO group/total active hydrogen group ratio) is preferably from 0.5 to 4. The total active hydrogen groups mean the hydroxyl group in the non-crystalline polyol compound (b1) and the amino group in the polyamine compound (b2). The isocyanate group in the main agent (A) means the isocyanate group in the urethane prepolymer (a1) and the remaining polyisocyanate (a2).

In a case where the NCO group/total active hydrogen group ratio is changed within a range from 0.5 to 4, the elastic modulus of the cured product can be adjusted, and a target elastic modulus can be obtained depending on the application. Even if the NCO group/total active hydrogen group ratio is changed as described above, the strength at break and elongation at break of the cured product do not greatly change. Specifically, a rate of change of the strength at break and the elongation at break is suppressed to within ±20% with respect to the strength at break and the elongation at break when the mixing ratio (mass ratio) of the main agent (A) and the curing agent (B) is 1:1. As described above, even if the mixing ratio of the main agent (A) and the curing agent (B) is offset from 1:1, the strength at break and elongation at break of the cured product do not greatly change, so that the elastic modulus can be adjusted while maintaining high strength at break and elongation at break. Thus, according to one embodiment, the mixing ratio of the main agent (A) and the curing agent (B) can be set to from 3:7 to 7:3.

According to one embodiment, a mass ratio of the main agent (A) and the curing agent (B) is preferably from 3:7 to 7:3. According to the adhesive composition of the present embodiment, even if the mixing ratio of the main agent (A) and the curing agent (B) is offset within such a range, for example, the effect on the magnitudes of the strength at break and elongation at break of the cured product is extremely low. Specifically, the rate of change of the strength at break and the elongation at break is suppressed to within ±20% with respect to the strength at break and the elongation at break when the mass ratio is 1:1. On the other hand, a maximum value of the tensile modulus can be adjusted to, for example, three or more times the minimum value within the range of the mass ratio.

The main agent (A) and the curing agent (B) described above each may further contain, if necessary, various additives, in a range that does not inhibit the object of the present invention, such as fillers, curing catalysts, plasticizers, anti-aging agents, antioxidants, pigments (dyes), thixotropic agents, ultraviolet absorbers, flame retardants, surfactants (including leveling agents), dispersing agents, dehydrating agents, adhesion promoters, and antistatic agents.

The main agent (A) preferably contains at least one selected from the group consisting of fillers, anti-aging agents, colorants, viscosity modifiers, and plasticizers.

The curing agent (B) preferably contains at least one selected from the group consisting of fillers, anti-aging agents, colorants, viscosity modifiers, plasticizers, and polyhydric alcohols having a number average molecular weight of less than 500. For example, the low-molecular-weight polyhydric alcohols described above can be used as the polyhydric alcohols having a number average molecular weight of less than 500.

The adhesive composition needs not include a catalyst such as an organometallic compound, a tertiary amine, or the like. That is, according to one embodiment, the adhesive composition is preferably free of a catalyst such as an organometallic compound, a tertiary amine, or the like.

Here, a curing reaction of the adhesive composition will be conceptually described with reference to FIG. 1. Typically, from a state at the time point of mixing two liquids illustrated in FIG. 1(a), through a state in the middle of the curing reaction illustrated in FIG. 1(b), a final form (cured product indicated by reference numeral 1) illustrated in FIG. 1(c) is reached. However, the final form may be a state as illustrated in any of FIGS. 1(a) to 1(c) depending on the mixing ratio of the main agent (A) and the curing agent (B). Typically, the urethane prepolymer (a1) (reference numeral a1) and the remaining polyisocyanate (a2) contained in the main agent (A) are reacted with the polyamine compound (b2) contained in the curing agent (B) to form a hard particulate substance and grow (reference numeral 3). On the other hand, the non-crystalline polyol compound (b1) contained in the curing agent (B) reacts behind the reaction between the remaining polyisocyanate (a2) contained in the main agent (A) and the polyamine compound (a2) to form a large number of matrices 5. Depending on the mixing ratio of the main agent (A) and the curing agent (B), the number and size of particles formed change, and the particles change between a spherulitic level and micron-level fine particles. It is believed that the change is reflected in the magnitude of the elastic modulus of the cured product. On the other hand, the strength at break and elongation at break of the cured product are adjusted by defining, in the above ranges, the molecular weights of the crystalline polyol compound and the non-crystalline polyol compound (b1) and the above-described equivalent ratio defined among these polyol compounds, polyisocyanate, and the polyamine compound (a2).

According to the adhesive composition of the present embodiment, tensile properties of a cured product, such as strength at break and elongation at break, are excellent, a cured product having low temperature dependence of viscoelastic properties is obtained, and foaming can be suppressed.

The tensile properties include the strength at break, the elongation at break, and the tensile modulus. Specifically, a cured product having a strength at break of 10 MPa or greater and an elongation at break of 100% or greater is obtained as a cured product having excellent tensile properties. Such tensile properties have such a magnitude that while the elongation at break is equal to that of prior art polyurethane-based adhesives, the strength at break is in accordance with to the strength at break of an epoxy resin-based adhesive. As a cured product having low temperature dependence of viscoelastic properties, a cured product is obtained in which a storage modulus (E1') at 130° C. of the cured product secures a magnitude of 50% or greater of a storage modulus (E2') at −40° C. In general, in urethane-based adhesives, at high temperatures of 120° C. or higher, the elastic modulus decreases and the adhesive softens compared to at low temperatures, and in some cases the adhesive may be soften. However, in the cured product obtained from the adhesive composition of the present embodiment, the tendency is improved, and the cured product has a property that the temperature dependence is extremely low. The cured product having such properties is suitable for, for example, bonding components of a structural member such as a body of an automobile.

The strength at break is preferably 20 MPa or greater and more preferably 25 MPa or greater. The upper limit of the strength at break is not particularly limited, but is, for example, approximately 100 MPa.

The elongation at break is preferably 150% or greater and more preferably 200% or greater. The upper limit of the elongation at break is not particularly limited, but is, for example, approximately 500%.

A storage modulus ratio (ratio E1'/E2' of the storage modulus (E1') at 130° C. to the storage modulus (E2') at −40° C.) is preferably 50% or greater, and more preferably 60% or greater, for example.

According to the present embodiment, the usable time of the adhesive composition is from 30 seconds to 10 minutes.

When the usable time is within 10 minutes, workability is excellent and, foaming can be suppressed. In a case where the usable time is 30 seconds or more, the curing time is not too short, and workability is excellent. The usable time means time until the main agent (A) and the curing agent (B) begin to be mixed and then cannot be handled.

The usable time is preferably within 7 minutes and more preferably within 5 minutes.

The tensile modulus is preferably 50 MPa or greater and more preferably 100 or greater. The upper limit of the elastic modulus is not particularly limited, but is, for example, approximately 500 MPa.

According to the adhesive composition of the present embodiment, a flow starting temperature of the cured product is 130° C. or higher and preferably 150° C. or higher, and a cured product having excellent heat resistance is obtained. The flow starting temperature is measured using a flow tester.

The adhesive composition of the present embodiment is not limited to, for example, a body of an automobile, and is used for bonding components of various structural bodies together. In addition to being used as an adhesive, the adhesive composition of the present embodiment can be used, for example, as paint, waterproof material, flooring material, elastomer, artificial leather, spandex, and the like.

(Method for Producing Adhesive Composition)

A method for producing an adhesive composition according to one embodiment includes a step of preparing the main agent (A) and a step of preparing the curing agent (B).

In the step of preparing the main agent (A), a raw polyisocyanate and a crystalline polyol compound are reacted so that the index is from 2.05 to 12 and all of the crystalline polyol compounds are monomer units of the urethane prepolymer (a1), thus preparing the urethane prepolymer (a1). Thus, the main agent (A) containing the urethane prepolymer (a1) and the remaining polyisocyanate (a2) is prepared. Here, the raw polyisocyanate, the crystalline polyol compound, the urethane prepolymer (a1), and the remaining polyisocyanate (a2) are each configured in the same manner as the raw polyisocyanate, the crystalline polyol compound, the urethane prepolymer (a1), and the remaining polyisocyanate (a2) described above.

In the step of preparing the curing agent (B), the curing agent (B) containing the non-crystalline polyol compound (b1) and the polyamine compound (b2) is prepared. Here, the non-crystalline polyol compound (b1) and the polyamine compound (b2) are configured in the same manner as the non-crystalline polyol compound (b1) and the polyamine compound (b2) described above.

The adhesive composition described above can be produced using the production method described above.

Experiment

In order to investigate the effects of the present invention, adhesive compositions were prepared according to formulation amounts shown in Tables 1 to 3, and foaming performance, usable time, strength at break, elongation at break, and storage modulus of the cured product were measured.

Urethane prepolymers 1 to 4 were prepared in the following manner, and additives shown in the table were added to prepare a main agent. In addition, raw materials shown in the table were mixed to prepare a curing agent.

<Synthesis of Urethane Prepolymer 1>

100 g of polytetramethylene ether glycol and 100 g of 4,4'-diphenylmethane diisocyanate (index 4.0) were stirred for 4 hours at 80° C. in a nitrogen atmosphere and reacted to synthesize the urethane prepolymer 1.

<Synthesis of Urethane Prepolymer 2>

100 g of polytetramethylene ether glycol and 150 g of 4,4'-diphenylmethane diisocyanate (index 6.0) were stirred for 4 hours at 80° C. in a nitrogen atmosphere and reacted to synthesize the urethane prepolymer 2.

<Synthesis of Urethane Prepolymer 3>

100 g of polycarbonate diol and 100 g of 4,4'-diphenylmethane diisocyanate (index 4.0) were stirred for 4 hours at 80° C. in a nitrogen atmosphere and reacted to synthesize the urethane prepolymer 3.

<Synthesis of Urethane Prepolymer 4>

100 g of polycarbonate diol and 150 g of 4,4'-diphenylmethane diisocyanate (index 6.0) were stirred for 4 hours at 80° C. in a nitrogen atmosphere and reacted to synthesize the urethane prepolymer 4.

As the polytetramethylene ether glycol, polycarbonate diol, and 4,4'-diphenylmethane diisocyanate used in the preparation of the urethane prepolymers 1 to 4 described above, those described below were used.

Polytetramethylene Glycol:
PTMG1000 (weight average molecular weight: 1000), available from Mitsubishi Chemical Corporation.

Polycarbonate Diol:
Duranol T6001 (weight average molecular weight: 1000), available from Asahi Kasei Corporation 4,4'-diphenylmethane Diisocyanate:
Millionate MT (weight average molecular weight: 250), available from Tosoh Corporation In the table, the values of the urethane prepolymers 1 to 4 indicate a total amount of the urethane prepolymer (a1) and the remaining polyisocyanate (a2). As raw materials other than the urethane prepolymers 1 to 4 shown in the table, those described below were used. In the table, the amount of the raw material is indicated by parts by mass.

Carbon black: 200 MP, available from NSCC Carbon Co., Ltd.

Calcium carbonate 1: heavy calcium carbonate, Super S, available from Maruo Calcium Co., Ltd.

Plasticizer: diisononyl phthalate, available from Jay Plus, Inc.

Polyol 1: polyol block adducted to glycerin in the order of PO (1,2-propylene oxide)-EO (ethylene oxide)-PO (1,2-propylene oxide), SANNIX GL-3000, available from Sanyo Chemical Industries, Ltd.

Polyol 2: polyisoprene polyol, available from Idemitsu Kosan Co., Ltd.

Polyol 3: 1,4-butanediol, available from Mitsubishi Chemical Corporation

Polyamine: diethylmethylbenzenediamine, DETDA, available from Mitsui Fine Chemicals, Inc.

Calcium carbonate 2: light calcium carbonate, KALFAIN 200, available from Maruo Calcium Co., Ltd.

Silica: Reolosil QS-102S, available from Tokuyama Corporation

In the table, "main agent (A)/curing agent (B) ratio" means the mass ratio of the main agent and the curing agent.

Although not shown in the table, the amino group/hydroxyl group ratio was adjusted within a range from 1.5 to 6.

The main agent and the curing agent prepared were mixed at the main agent (A)/curing agent (B) ratio shown in the table, the foaming performance and the usable time were evaluated in the following manner, and the strength at break, the elongation at break, and the storage modulus were measured. The isocyanate group/amino group ratio and the isocyanate group/hydroxyl group ratio are also shown in the table.

<Foaming Performance>

A cured product having a thickness of 2 mm was produced, and the presence or absence of swelling due to air bubbles on a surface of the cured product, and the presence or absence of air bubbles when a cross section of the curing agent cut by a cutter knife was observed were examined as the foaming performance, and the foaming performance was evaluated when the main agent and the curing agent were mixed. The cured product with no prominent air bubbles was evaluated as A, among the cured products with air bubbles, the cured product with many air bubbles or the cured product with large air bubbles with a diameter of 1 mm or greater was evaluated as C, and the other cured products were evaluated as B. Of these, A was evaluated as suppressing foaming.

<Usable Time>

The usable time was time until the main agent and the curing agent were mixed and then could not be handled, that is, time until fluidity of the adhesive was significantly lost. The usable time of from 30 seconds to 10 minutes was evaluated as being applicable, that is, suitable usable time.

<Strength at Break, Elongation at Break>

A dumbbell-shaped No. 3 test piece was used, a tensile test in accordance with JIS K6251, and the tensile strength (strength at break) and rupture elongation (elongation at break) were measured under conditions of a temperature of 20° C. and a crosshead speed (tensile speed) of 200 mm/min. Marked lines for the elongation at break measurement were marked 20 mm apart. As a result, when the strength at break was 10 MPa or greater, the strength at break was evaluated as excellent, and when the elongation at break was 100% or greater, the elongation at break was evaluated as excellent.

<Viscoelastic Properties>

The storage modulus E' was measured by performing dynamic mechanical analysis for a cured product by applying forced extension vibration in a temperature region from −60° C. to 160° C. at a strain of 0.1%, a frequency of 10 Hz, and a temperature increase rate of 5° C./min. From the measurement result, the ratio of the storage modulus (E1') at 130° C. to the storage elasticity (E2') at −40° C. was calculated. As a result, the cured product in which the storage modulus ratio E1'/E2' was 50% or greater was evaluated as having a low temperature dependence of viscoelastic properties.

TABLE 1

|  |  | Examples | | | |
| --- | --- | --- | --- | --- | --- |
|  |  | 1 | 2 | 3 | 4 |
| Main agent (A) | Urethane prepolymer 1 | 40 |  |  |  |
|  | Urethane prepolymer 2 |  | 50 |  |  |
|  | Urethane prepolymer 3 |  |  | 40 |  |
|  | Urethane prepolymer 4 |  |  |  | 50 |
|  | Carbon black | 3 | 3 | 3 | 3 |
|  | Calcium carbonate 1 | 10 | 10 | 10 | 10 |
|  | Plasticizer | 10 | 10 | 10 | 10 |
| Curing agent (B) | Polyol 1 | 15 | 25 | 15 | 25 |
|  | Polyol 2 |  |  |  |  |
|  | Polyol 3 |  |  |  |  |
|  | Polyamine | 8 | 10 | 8 | 10 |
|  | Calcium carbonate 2 | 35 | 30 | 35 | 30 |
|  | Silica | 5 | 5 | 5 | 5 |
| Index |  | 4 | 6 | 4 | 6 |
| Total amount of main agent (A) |  | 63 | 73 | 63 | 73 |
| Total amount of curing agent (B) |  | 63 | 70 | 63 | 70 |

TABLE 1-continued

| | Examples | | | |
|---|---|---|---|---|
| | 1 | 2 | 3 | 4 |
| Main agent (A)/curing agent (B) ratio | 1 | 1.04 | 1 | 1.04 |
| Isocyanate group/amino group ratio | 1.33 | 1.79 | 1.33 | 1.79 |
| Isocyanate group/hydroxyl group ratio | 8.57 | 8.33 | 8.57 | 8.33 |
| Foaming performance | A | A | A | A |
| Usable time (min) | 3 | 2 | 3 | 2 |
| Strength at break (MPa) | 40 | 52 | 48 | 55 |
| Elongation at break (%) | 220 | 300 | 250 | 350 |
| Storage modulus ratio (%) | 66 | 70 | 62 | 76 |

TABLE 2

| | | Examples | | |
|---|---|---|---|---|
| | | 5 | 6 | 7 |
| Main agent (A) | Urethane prepolymer 1 | | | |
| | Urethane prepolymer 2 | 50 | | 50 |
| | Urethane prepolymer 3 | | | |
| | Urethane prepolymer 4 | | 50 | |
| | Carbon black | 3 | 3 | 3 |
| | Calcium carbonate 1 | 10 | 10 | 10 |
| | Plasticizer | 10 | 10 | 10 |
| Curing agent (B) | Polyol 1 | | | |
| | Polyol 2 | 20 | 25 | 20 |
| | Polyol 3 | | | 3 |
| | Polyamine | 10 | 10 | 3 |
| | Calcium carbonate 2 | 35 | 30 | 35 |
| | Silica | 5 | 5 | 5 |
| Index | | 6 | 4 | 6 |
| Total amount of main agent (A) | | 73 | 73 | 73 |
| Total amount of curing agent (B) | | 70 | 70 | 66 |
| Main agent (A)/curing agent (B) ratio | | 1.04 | 1.04 | 1.11 |
| Isocyanate group/amino group ratio | | 1.79 | 1.79 | 5.88 |
| Isocyanate group/hydroxyl group ratio | | 11.76 | 9.52 | 2.4 |
| Foaming performance | | A | A | A |
| Usable time (min) | | 2 | 2 | 10 |
| Strength at break (MPa) | | 30 | 35 | 40 |
| Elongation at break (%) | | 150 | 190 | 210 |
| Storage modulus ratio (%) | | 70 | 67 | 73 |

TABLE 3

| | | Comparative Examples | | | |
|---|---|---|---|---|---|
| | | 1 | 2 | 3 | 4 |
| Main agent (A) | Urethane prepolymer 1 | | | 40 | |
| | Urethane prepolymer 2 | 40 | 40 | | |
| | Urethane prepolymer 3 | | | | |
| | Urethane prepolymer 4 | | | | 40 |
| | Carbon black | 3 | 3 | 3 | 3 |
| | Calcium carbonate 1 | 10 | 10 | 10 | 30 |
| | Plasticizer | 15 | 15 | 15 | 30 |
| Curing agent (B) | Polyol 1 | | | 61 | 8 | 75 |
| | Polyol 2 | 5 | | | |
| | Polyol 3 | 3 | | | |
| | Polyamine | 8 | 2 | 5 | 2 |
| | Calcium carbonate 2 | 40 | 40 | 40 | 20 |
| | Silica | 5 | 5 | 5 | 5 |
| Index | | 6 | 6 | 4 | 1.9 |
| Total amount of main agent (A) | | 68 | 68 | 68 | 103 |
| Total amount of curing agent (B) | | 61 | 108 | 58 | 102 |
| Main agent (A)/curing agent (B) ratio | | 1.11 | 0.63 | 1.17 | 1 |
| Isocyanate group/amino group ratio | | 1.78 | 7.27 | 2.85 | 2 |
| Isocyanate group/hydroxyl group ratio | | 1.92 | 2.71 | 20 | 1.13 |
| Foaming performance | | B | C | C | B |
| Usable time (min) | | 2 | 20 | 5 | 30 |
| Strength at break (MPa) | | 45 | 17 | 20 | 15 |
| Elongation at break (%) | | 130 | 150 | 180 | 165 |
| Storage modulus ratio (%) | | 25 | 35 | 20 | 45 |

From the comparison of Examples 1 to 7 with Comparative Examples 1 to 4, according to the adhesive composition which uses the raw polyisocyanate and the crystalline polyol compound, contains, in the main agent, the urethane prepolymer (a1) and the remaining polyisocyanate (a2) prepared so that the index is from 2.05 to 12, and contains the non-crystalline polyol compound (b1) and the polyamine compound (b2) in the curing agent and in which the isocyanate group/amino group ratio is from 1.2 to 6 and the isocyanate group/hydroxyl group ratio is 2 to 12, it can be seen that it is possible to obtain a cured product that has excellent tensile properties such as strength at break and elongation at break and in which the temperature dependence of viscoelastic properties is low and to suppress foaming.

The foregoing has been a description of the two-part curable adhesive composition according to embodiments of the present invention. However, the present invention is naturally not limited to the above embodiments and Examples, and may be improved or modified in various ways within the scope of the present invention.

REFERENCE SIGNS LIST

1 Cured product
3 Particulate substance
5 Matrix

The invention claimed is:

1. A two-part curable adhesive composition, comprising:
a main agent (A) containing a urethane prepolymer (a1); and
a curing agent (B) containing a non-crystalline polyol compound (b1) and a polyamine compound (b2),
the urethane prepolymer (a1) being obtained by reacting a raw polyisocyanate and a crystalline polyol compound having a number average molecular weight of 500 or greater and having at least one hydroxyl group per molecule in such a manner that an equivalent ratio of an isocyanate group in the raw polyisocyanate to the hydroxyl group in the crystalline polyol compound is from 2.05 to 12 and all of the crystalline polyol compounds are monomer units of the urethane prepolymer (a1),
the main agent (A) further containing, in addition to the urethane prepolymer (a1), a remaining polyisocyanate (a2) that is a remainder of the raw polyisocyanate not having been reacted with the crystalline polyol compound,
the non-crystalline polyol compound (b1) being a compound having a number average molecular weight of 1000 or greater and having at least two hydroxyl groups per molecule,
the equivalent ratio of the isocyanate group in the main agent (A) to an amino group in the polyamine compound (b2) being from 1.2 to 6, and
the equivalent ratio of the isocyanate group in the main agent (A) to the hydroxyl group in the non-crystalline polyol compound (b1) being from 2 to 12.

2. The two-part curable adhesive composition according to claim 1, wherein the equivalent ratio of the amino group in the polyamine compound (b2) to the hydroxyl group in the non-crystalline polyol compound (b1) is from 1.5 to 6.

3. The two-part curable adhesive composition according to claim 1, wherein a ratio of a mass of the crystalline polyol compound to a mass of the non-crystalline polyol compound (b1) is 1 or less.

4. The two-part curable adhesive composition according to claim 1, wherein the crystalline polyol compound is at least one selected from polyester polyol, polytetramethylene ether glycol, polycarbonate polyol, and polycaprolactone polyol.

5. The two-part curable adhesive composition according to claim 4, wherein the crystalline polyol compound is polytetramethylene ether glycol or polycarbonate polyol.

6. The two-part curable adhesive composition according to claim 1, wherein the non-crystalline polyol compound (b1) is at least one selected from polyoxypropylene glycol, polybutadiene polyol, polyisoprene polyol, and polyacrylic polyol.

7. The two-part curable adhesive composition according to claim 1, wherein a terminal end of the non-crystalline polyol compound (b1) includes at least one selected from a primary hydroxyl group, a secondary hydroxyl group, an amino group, an acid anhydride modified group, and a ring-opened group formed by ring opening of an acid anhydride modified group.

8. The two-part curable adhesive composition according to claim 1, wherein the curing agent (B) further contains a hydroxy group-containing compound (b3) having a number average molecular weight of 200 or less in an amount of 5% by mass or greater of the curing agent (B).

9. The two-part curable adhesive composition according to claim 1, wherein the remaining polyisocyanate (a2) is at least one selected from diphenylmethane diisocyanate, polymeric methane diisocyanate, and isocyanate compound having an isocyanurate group.

10. The two-part curable adhesive composition according to claim 1, wherein the non-crystalline polyol compound (b1) includes in the molecule at least one of a monomer unit of polyethylene glycol or a monomer unit of polypropylene glycol.

11. The two-part curable adhesive composition according to claim 1, wherein the polyamine compound (b2) has a number average molecular weight of less than 500 and has at least two amino groups and at least one aromatic group per molecule.

12. The two-part curable adhesive composition according to claim 1, wherein an equivalent ratio of the isocyanate group in the main agent (A) to the total active hydrogen groups in the curing agent (B) is from 0.5 to 4.

13. The two-part curable adhesive composition according to claim 1, wherein a mass ratio of the main agent (A) to the curing agent (B) is adjusted to be from 3:7 to 7:3.

14. The two-part curable adhesive composition according to claim 1, wherein a storage modulus (E1') at 130° C. of a cured product obtained by curing the two-part curable adhesive composition is 50% or greater of a storage modulus (E2') at −40° C.

15. The two-part curable adhesive composition according to claim 1, wherein the cured product obtained by curing the two-part curable adhesive composition has a tensile strength in accordance with JIS K6251 of 10 MPa or greater and an elongation at break of 100% or greater.

16. The two-part curable adhesive composition according to claim 1, wherein a tensile modulus of the cured product obtained by curing the two-part curable adhesive composition is 50 MPa or greater.

17. The two-part curable adhesive composition according to claim 1, wherein a usable time is from 30 seconds to 10 minutes.

18. The two-part curable adhesive composition according to claim 1, wherein the main agent (A) contains at least one selected from fillers, anti-aging agents, colorants, viscosity modifiers, and plasticizers.

19. The two-part curable adhesive composition according to claim 1, wherein the curing agent (B) contains at least one selected from fillers, anti-aging agents, colorants, viscosity modifiers, plasticizers, and polyhydric alcohols having a number average molecular weight of less than 500.

20. A two-part curable adhesive composition, comprising:
a main agent (A) containing a urethane prepolymer (a1);
a curing agent (B) containing a non-crystalline polyol compound (b1) and a polyamine compound (b2),
the urethane prepolymer (a1) being obtained by reacting a raw polyisocyanate and a crystalline polyol compound having a number average molecular weight of 500 or greater and having at least one hydroxyl group per molecule in such a manner that an equivalent ratio of an isocyanate group in the raw polyisocyanate to the hydroxyl group in the crystalline polyol compound is from 2.05 to 12 and all of the crystalline polyol compounds are monomer units of the urethane prepolymer (a1),
the main agent (A) further containing, in addition to the urethane prepolymer (a1), a remaining polyisocyanate (a2) being a remainder of the raw polyisocyanate not having been reacted with the crystalline polyol compound,
the non-crystalline polyol compound (b1) being a compound having a number average molecular weight of 1000 or greater and having at least two hydroxyl groups per molecule, and the equivalent ratio of the isocyanate group in the main agent (A) to an amino group in the polyamine compound (b2) and the equivalent ratio of the isocyanate group in the main agent (A) to the hydroxyl group in the non-crystalline polyol compound (b1) being adjusted in such a manner that a storage modulus (E1') at 130° C. of a cured product obtained by curing the two-part curable adhesive composition is 50% or greater of a storage modulus (E2') at −40° C.

\* \* \* \* \*